US012554052B2

(12) United States Patent
Stover et al.

(10) Patent No.: US 12,554,052 B2
(45) Date of Patent: Feb. 17, 2026

(54) INTEGRAL MULTILAYER OPTICAL FILM

(71) Applicant: 3M INNOVATIVE PROPERTIES COMPANY, St. Paul, MN (US)

(72) Inventors: Carl A. Stover, St. Paul, MN (US); Kristopher J. Derks, Woodbury, MN (US); Benjamin J. Forsythe, Stillwater, MN (US); Stephen A. Johnson, Woodbury, MN (US); Derek W. Patzman, Prior Lake, MN (US); David T. Yust, Woodbury, MN (US); Steven H. Kong, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 373 days.

(21) Appl. No.: 18/245,290

(22) PCT Filed: Sep. 9, 2021

(86) PCT No.: PCT/IB2021/058222
§ 371 (c)(1),
(2) Date: Mar. 14, 2023

(87) PCT Pub. No.: WO2022/069977
PCT Pub. Date: Apr. 7, 2022

(65) Prior Publication Data
US 2023/0358934 A1    Nov. 9, 2023

Related U.S. Application Data

(60) Provisional application No. 63/086,184, filed on Oct. 1, 2020.

(51) Int. Cl.
*G02B 5/28* (2006.01)
*G02B 5/02* (2006.01)
*G02B 5/30* (2006.01)

(52) U.S. Cl.
CPC .......... *G02B 5/287* (2013.01); *G02B 5/0242* (2013.01); *G02B 5/3083* (2013.01)

(58) Field of Classification Search
None
See application file for complete search history.

(56) References Cited

U.S. PATENT DOCUMENTS

| 5,882,774 A | 3/1999 | Jonza et al. |
| 6,179,948 B1 | 1/2001 | Merrill et al. |

(Continued)

FOREIGN PATENT DOCUMENTS

| WO | 2008005760 A1 | 1/2008 |
| WO | 2020068513 A1 | 4/2020 |
| WO | 2020115679 A3 | 6/2020 |

OTHER PUBLICATIONS

International Search Report for PCT International Application No. PCT/IB2021/058222, mailed on Nov. 16, 2021, 4 pages.

*Primary Examiner* — Shan Liu
(74) *Attorney, Agent, or Firm* — Clifton F. Richardson

(57) ABSTRACT

An integral multilayer optical film includes a plurality of interference layers; a structured layer disposed on the interference layers and including a plurality of particles dispersed in a binder; and a barrier layer disposed between the structured layer and the interference layers and co-extruded with the interference layers and the structured layer. The structured layer has a first major surface facing away from the interference layers and a second major surface facing the interference layers. The barrier layer causes the particles to impart a greater surface roughness to the first major surface than the second major surface so that when the optical film is illuminated with a light source, the optical film has a first average effective transmission T1 when the first major surface faces the light source and a second average effective (Continued)

transmission T2 when the first major surface faces away from the light source, where T1-T2≥5%.

18 Claims, 14 Drawing Sheets

(56) References Cited

U.S. PATENT DOCUMENTS

| | | | | |
|---|---|---|---|---|
| 6,268,961 | B1* | 7/2001 | Nevitt | G02B 5/0278 |
| | | | | 349/84 |
| 6,783,349 | B2 | 8/2004 | Neavin et al. | |
| 6,967,778 | B1 | 11/2005 | Wheatley et al. | |
| 8,012,571 | B2 | 9/2011 | Liu et al. | |
| 8,169,691 | B1 | 5/2012 | Miyamoto et al. | |
| 9,162,406 | B2 | 10/2015 | Neavin et al. | |
| 2003/0214812 | A1* | 11/2003 | Bourdelais | G02B 5/0221 |
| | | | | 362/330 |
| 2004/0066556 | A1 | 4/2004 | Dontula et al. | |
| 2005/0046321 | A1* | 3/2005 | Suga | G02B 6/0051 |
| | | | | 313/112 |
| 2007/0298271 | A1 | 12/2007 | Liu et al. | |
| 2008/0002256 | A1* | 1/2008 | Sasagawa | G02B 5/0278 |
| | | | | 359/487.03 |
| 2011/0051040 | A1 | 3/2011 | Johnson et al. | |
| 2011/0279752 | A1* | 11/2011 | Yamahara | G02B 5/02 |
| | | | | 349/64 |
| 2015/0226883 | A1 | 8/2015 | Derks et al. | |
| 2018/0348418 | A1* | 12/2018 | Stover | G02B 5/3041 |
| 2019/0391311 | A1 | 12/2019 | Nevitt et al. | |

* cited by examiner

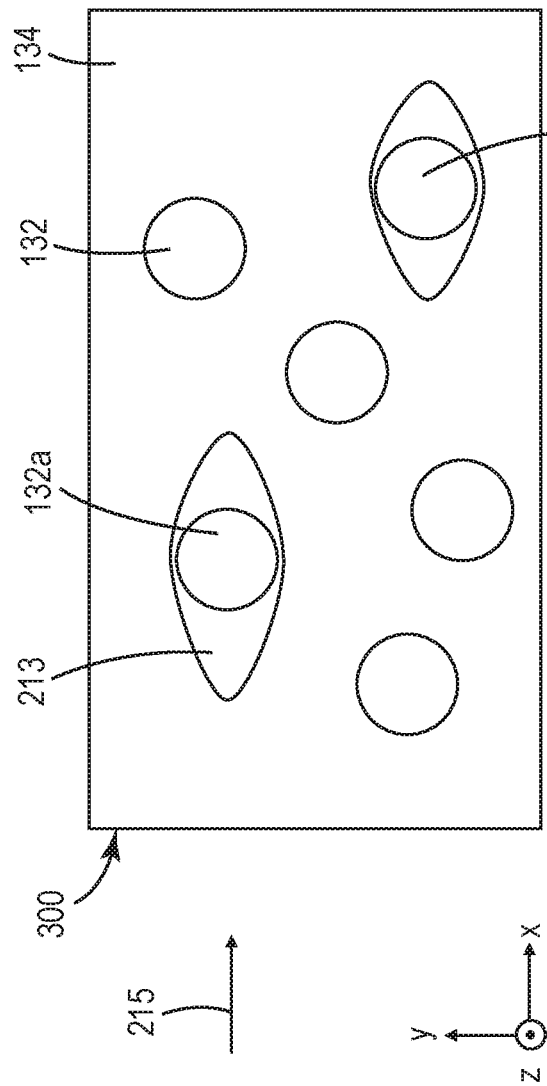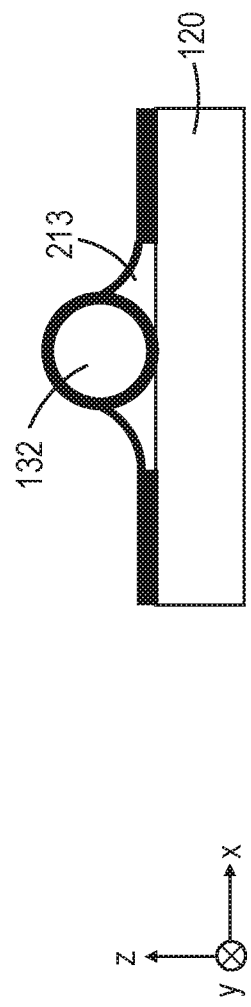
FIG. 4
FIG. 5

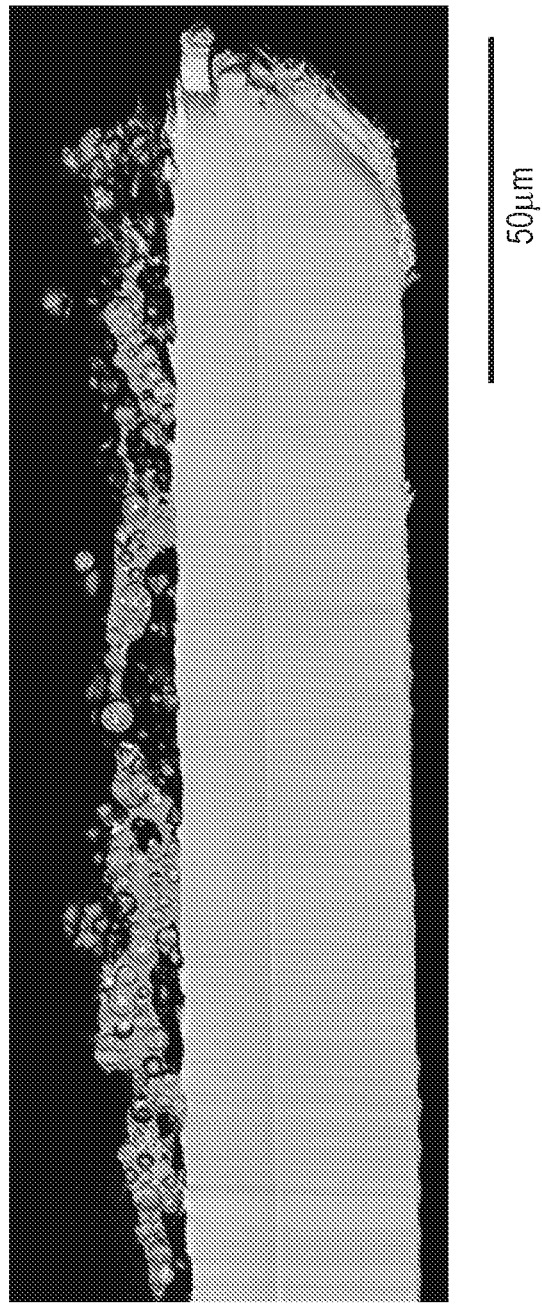

INTEGRAL MULTILAYER OPTICAL FILM

CROSS REFERENCE TO RELATED APPLICATIONS

This application is a national stage filing under 35 U.S.C. 371 of PCT/IB2021/058222, filed Sep. 9, 2021, which claims the benefit of U.S. Application No. 63/086,184, filed Oct. 1, 2020, the disclosures of which are incorporated by reference in their entirety herein.

BACKGROUND

An optical film can include a reflective polarizer and a beaded layer coated onto the reflective polarizer.

SUMMARY

The present disclosure generally relates to optical films including a structured layer co-extruded with at least one other layer.

In some aspects of the present disclosure, an integral multilayer optical film including a plurality of polymeric interference layers, a structured layer disposed on the interference layers, and a barrier layer disposed between the structured layer and the interference layers and co-extruded at least with the interference layers and the structured layer is provided. The plurality of polymeric interference layers can number at least 30 in total and reflect and transmit light primarily by optical interference for at least one wavelength in a wavelength range extending from about 400 nm to about 1500 nm. The structured layer is disposed on the interference layers and includes a plurality of particles dispersed in a binder and opposing first and second major surfaces. The first major surface faces away from the interference layers and the second major surface faces the interference layers. The barrier layer causes the particles to impart a greater surface roughness to the first major surface than the second major surface so that when the optical film is illuminated with a light source, the optical film has a first average effective transmission T1 when the first major surface faces the light source and a second average effective transmission T2 when the first major surface faces away from the light source, where T1-T2≥5%.

In some aspects of the present disclosure, an integral multilayer optical film including a plurality of stacked polymeric layers and a structured layer disposed on the polymeric layers is provided. The plurality of stacked polymeric layers can number at least 30 in total. Each polymeric layer has an average thickness less than about 500 nm. The structured layer includes a plurality of particles dispersed in a binder and has a first major surface facing away from the polymeric layers and including a plurality of structures formed by the particles. The structured layer is co-extruded and co-stretched with the polymeric layers so that for each particle in a sub-plurality of the particles, the particle is disposed in a corresponding void elongated along a first direction.

In some aspects of the present disclosure, an integral multilayer optical film including a strain-hardening polymer layer having an average thickness greater than about 1 micrometer, and a structured layer disposed on, and co-extruded with, the strain-hardening polymer layer is provided. The structured layer includes a plurality of particles dispersed in a thermoplastic binder and has a first major surface facing away from the strain-hardening polymer layer and including a plurality of structures formed by the particles. When the optical film is illuminated with a light source, the optical film has a first average effective transmission T1 when the first major surface faces the light source and a second average effective transmission T2 when the first major surface faces away from the light source, where T1-T2≥5%.

These and other aspects will be apparent from the following detailed description. In no event, however, should this brief summary be construed to limit the claimable subject matter.

BRIEF DESCRIPTION OF THE DRAWINGS

FIG. 4 is a schematic top view of an illustrative integral multilayer optical film.

FIG. 5 is a schematic cross-sectional view of an illustrative integral multilayer optical film schematically illustrating a void.

FIG. 9A is an image of a cross-section of another optical film.

DETAILED DESCRIPTION

Figure 1:
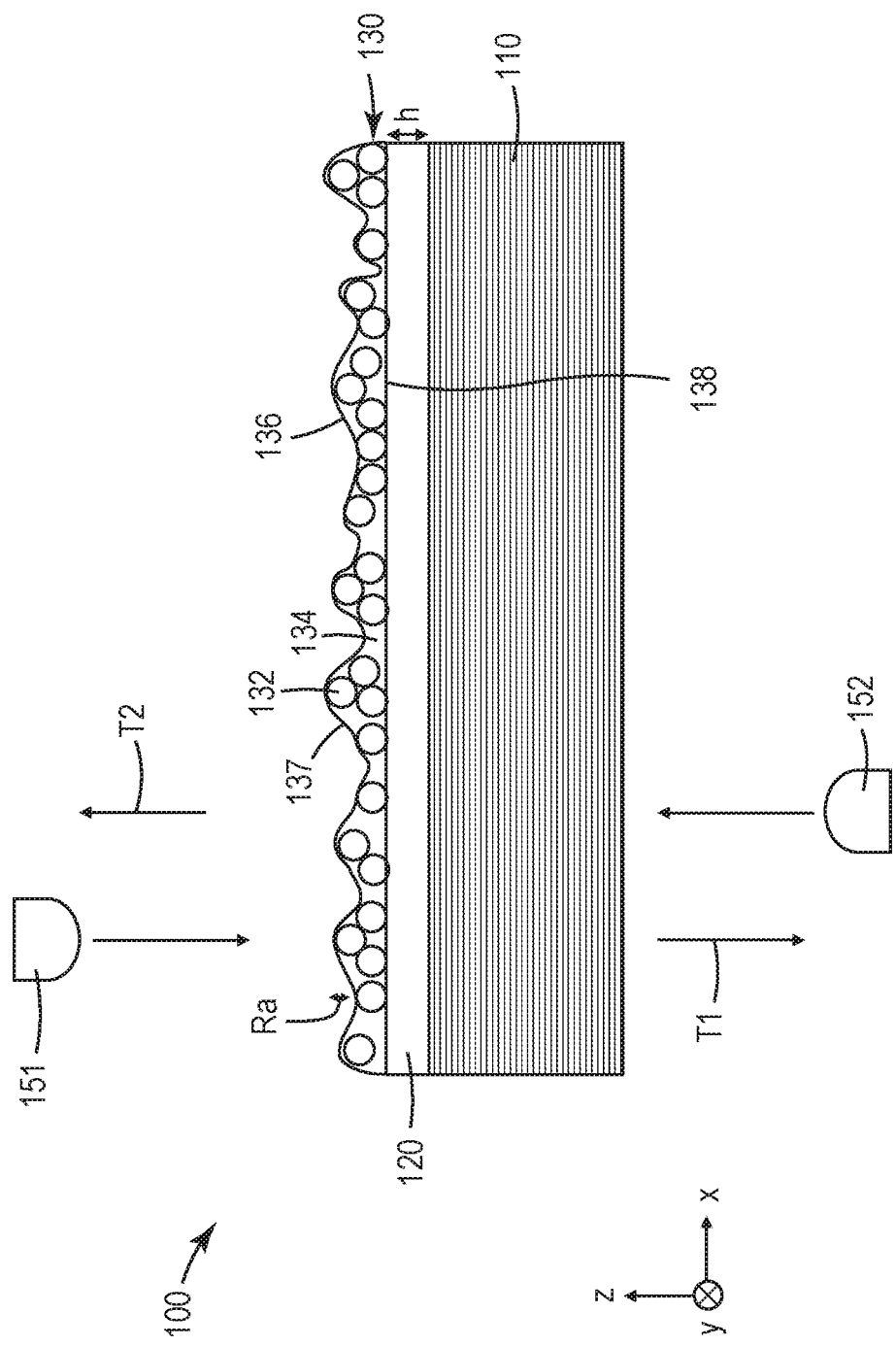
FIGS. 1-2 are schematic cross-sectional views of illustrative integral multilayer optical films.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

In many consumer electronic displays, it is desirable to have a uniform projection of light towards the viewer. This can be achieved using a bulk diffuser film that has high haze allowing for the scattering of visible light. This scattering of the visible light allows for better uniformity but can also decreases the effective brightness. To counter the brightness drop, and even increase the on-axis brightness, while keeping the haze high, a beaded surface can be coated on a substrate. The resulting film is often referred to as a beaded gain diffuser. Beaded gain diffusers are known in the art and are described in U.S. Pat. Appl. Pub. No. 2008/0002256 (Sasagawa et al.), for example.

Beaded gain diffusers are typically coated in a secondary step after the substrate film has been made. The beads are included in a beaded layer which is also typically a structured layer having a structured major surface. It is typically preferred that the beads in a beaded gain diffuser at least roughly approximate a hemisphere on the surface of the beaded layer. Previous attempts at co-extruding, and optionally co-stretching, a layer including micrometer scale beads at high loading in a binder has resulted in low uniformity of the beads and/or clustering of beads such that relatively few beads approximate a hemisphere on the surface of the beaded layer. The uniformity of approximately hemispherical protrusions of the beads can be characterized by the difference in effective transmission of the film for light incident on the structured surface of the beaded layer and for light incident on the opposite surface. A portion of light incident on the surface opposite the structured surface is reflected at the bead surface back through the film resulting in a reduced effective transmission. Thus, the difference in effective transmission can characterize the uniformity of approximately hemispherical protrusions of the beads. The optical films described herein, according to some embodiments, can provide a substantially higher difference in effective transmission than those resulting from previous attempts at co-extruding/co-stretching a layer including micrometer scale, for example, beads or other particles.

The effective transmission refers to the luminous transmittance of substantially normally incident light. The incident light can be understood to be unpolarized light, except where indicated differently. The average effective transmission is the effective transmission determined over, or averaged over, substantially the entire area of the optical film or determined over, or averaged over, an area sufficiently large (e.g., a diameter of at least about 0.5 mm, or at least about 1 mm, or at least about 5 mm) to average out the effects of local nonuniformities (e.g., clustering of particles). The average effective transmission can be determined as the luminous transmittance determined according to ASTM D1003-13. As indicated in the ASTM D1003-13 test standard, the luminous transmittance is transmittance weighted according to the spectral luminous efficiency function V( ) of the 1987 Commission Internationale de l'Éclairage (CIE). The haze may also be determined according to the ASTM D1003-13 test standard. This test standard described measuring haze with a hazemeter available from BYK-Gardner. The hazemeter can also be used to measure clarity (e.g., using the test method described in the manual for the HAZE-GARD hazemeter from BYK-Gardner). In some embodiments, the optical film has a haze greater than about 85% or greater than about 90%. In some such embodiments, or in other embodiments, the optical film has a clarity less than about 35% or less than about 30%. The haze and clarity are determined with the structured layer facing toward the light source, unless indicated differently.

According to some embodiments of the present disclosure, it has been found that a high loading of particles (e.g., beads which may be microspheres, or other particles) can be co-extruded and co-stretched with underlying layers when a barrier or strain-hardening layer is disposed between the structured layer (e.g., beaded layer) and the underlying layers. The barrier or strain-hardening layer can prevent the particles from sinking into the underlying layers and/or can push the particles out of a plane of the structured layer in a direction away from the underlying layers to produce a structured surface. Further, it has been found, according to some embodiments, that co-extruding a protective layer over the bead layer can keep the particles from releasing during high temperature processes, for example. In some embodiments, the protective layer is co-extruded with the structured layer and other layers and is then subsequently removed. In some embodiments, the protective layer is co-extruded, co-stretched and then removed. In some embodiments, the protective layer is co-extruded, co-stretched and remains in contact with the structured layer to aide with web handling, roll formation and/or downstream processes before removal. In some embodiments, the protective layer imparts additional robustness and/or cleanliness for downstream processes.

FIG. 1 is a schematic cross-sectional view of an illustrative integral multilayer optical film 100 according to some embodiments. In the illustrated embodiment, the optical film 100 includes layers 110, layer 120 and layer 130. The layers 110 can be a plurality of polymeric interference layers, a plurality of stacked polymeric layers, and/or can include at least one layer having a birefringence greater than about 0.1. The layer 130 is a structured layer having first and second major surfaces 136 and 138. The layer 120 can be a barrier layer and/or a strain-hardening layer included to cause the particles 132 to impart a greater surface roughness Ra to the first major surface 136 than the second major surface 138. The layers 110, 120 and 130 can be integrally formed (manufactured together rather than manufactured separately and then subsequently joined).

In some embodiments, the layers 110 are a plurality of polymeric interference layers numbering at least 30 in total and reflecting and transmitting light primarily by optical interference for at least one wavelength in a wavelength range extending from about 400 nm to about 1500 nm. The layer 130 is a structured layer disposed on the interference layers 110 and including a plurality of particles 132 dispersed in a binder 134 and having opposing first and second major surfaces 136 and 138, where the first major surface 136 faces away from the interference layers 110, and the second major surface 138 faces the interference layers 110. Layer 120 may be a barrier layer disposed between the structured layer 130 and the interference layers 110 and co-extruded at least with the interference layers 110 and the structured layer 130. The barrier layer 120 can cause the particles 132 to impart a greater surface roughness Ra to the first major surface 136 than the second major surface 138 so that when the optical film 100 is illuminated with a light source 151 or 152, the optical film 100 has a first average effective transmission T1 when the first major surface 136 faces the light source 151 and a second average effective transmission T2 when the first major surface 136 faces away from the light source 152. In some embodiments, T1-T2≥5%, or T1-T2≥6%, or T1-T2≥8%, T1-T2≥10%, or T1-T2≥12%, or T1-T2≥14%. A higher T1-T2 generally results in a higher gain when the integral optical film is used in a liquid crystal display. Suitable materials for the barrier layer 120 include strain-hardening polymers such as polyethylene terephthalate (PET) or polyethylene naphthalate (PEN) or copolymers thereof, for example. Suitable copolymers that can used for the barrier layer 120 are described in U.S. Pat. No. 8,012,571 (Liu et al.) and U.S. Pat. Appl. Pub. No. 2019/0391311 (Nevitt et al.), for example, and include PETg (glycol-modified PET), PENg (glycol-modified PEN), and PHEN (a naphthalate based copolyester containing 10 to 15 mol % hexanediol in place of ethylene glycol).

Interference layers may be described as reflecting or transmitting light primarily by optical interference when the reflectance and transmittance of the interference layers can be reasonably described by optical interference or reasonably accurately modeled as resulting from optical interference. Interference layers may have an average thickness less than about 500 nm, or less than about 300 nm, for example.

In some embodiments, the binder 134 is a thermoplastic binder. In some embodiments, the binder 134 includes a polymethylmethacrylate copolymer and polylactic acid. The polylactic acid can be included to lower the glass transition temperature of the binder. It has been found, according to some embodiments, that a binder with a lower glass transition temperature results in improved extension of the layer at lower temperatures and/or high draw rates, for example. In some embodiments, the thermoplastic binder has less crystallinity than the barrier layer. In some embodiments, the thermoplastics has a melt point lower than the barrier layer. In some embodiments, the binder includes copolyester PET (e.g., EASTAR Copolyester GN071 available from Eastman Chemical Company). Copolyester PET has a lower Tg, crystallinity, and melt point than coPEN 90/10 (PEN with 10% of the carboxylate units replaced with terephthalate units), for example, which is a useful material for the barrier layer and for high index optical layers. CoPEN 90/10 may also be referred to as low melting PEN or LMPEN. In some embodiments, the binder includes a plasticizer (e.g., at 1-10 weight percent). Suitable plasticizers include those available under the SEGETIS tradename (e.g., levulinic acid-ketal plasticizer) from Segetis, Inc. (Golden Valley, MN) and those available under the HALLGREEN tradename from Hallstar (Chicago, IL). The binder may also include a bead-binder compatibilizer (e.g., at 1-10 weight percent). Suitable compatibilizers include styrene maleic anhydride. It has been found that including a plasticizer and/or including a compatibilizer can give better bead arrangement during orientation, resulting in an increased T1-T2.

In some embodiments, the particles 132 are or include a polymer. For example, the particles 132 can be formed from a polymer which may be crosslinked. In some embodiments, the polymer includes polymethylmethacrylate or polystyrene.

In some embodiments, the particles 132 have an average diameter in a range of about 3 micrometers or about 5 micrometers to about 20 micrometers, or to about 15 micrometers, or to about 10 micrometers. For example, in some embodiments, the average diameter is in a range of about 5 to about 20 micrometers. The average diameter can be taken to be the volume median diameter (median diameter in a volume particle size distribution) which can be determined by laser diffraction, for example. In some embodiments, the particles are substantially monodispersed. In some embodiments, the particles 132 are substantially spherical (e.g., the particles 132 can be microspheres such as polymeric microspheres). A particle can be considered substantially spherical if its outline fits within the intervening space between two concentric truly spherical outlines differing in diameter from one another by less than 50% of the diameter of the larger of these outlines. In some embodiments, each particle in at least a majority of the particles 132 fits within the intervening space between two concentric truly spherical outlines differing in diameter from one another by up to about 30%, or up to about 20%, or up to about 10% of the diameter of the larger of these outlines.

In some embodiments, the particles 132 have a refractive index greater than about 1.45. Alternatively or in addition, in some embodiments, the binder 134 has a refractive index greater than about 1.45. In some embodiments, the refractive indices of the particles and the binder are each in a range of about 1.45 to about 1.8. The refractive indices can be understood to be determined at a wavelength of 633 nm, unless specified differently. In some embodiments, the absolute value of the difference in refractive indices of the particles 132 and the binder 134 is less than about 0.2, or less than about 0.15, or less than about 0.1.

In some embodiments, the first major surface 136 of the structured layer 130 has a surface roughnesses Ra (mean of magnitude of displacement of the surface from a mean plane) in a range of 0.5 to 20 micrometers, or 1 to 10 micrometers. The surface roughness Ra can be determined from surface profilometry measurements as is known in the art. The surface roughness Ra can be determined according to the ISO 4287:1997 standard, for example.

In some embodiments, the layer 120 has a glass transition temperature Tg1 and the binder 134 has a glass transition temperature Tg2, where Tg1>Tg2. In some such embodiments or in other embodiments, the layer 120 has an average thickness h greater than about 1 micrometer. In some such embodiments or in other embodiments, the layer 120 is or includes a strain-hardening polymer. In some embodiments, Tg1-Tg2 is greater than about 5° C., or greater than about 10° C., or greater than about 20° C., or greater than about 30° C. In some embodiments, the optical film is drawn and/or heat stabilized at a temperature higher than Tg1 and/or higher than Tg2+30° C., for example. In some cases, increasing the draw and/or heat stabilization temperature (e.g., to at least Tg2+30° C. but less than the melting point of the layer 120) can reduce clumping of beads in the structured layer.

Figure 2:
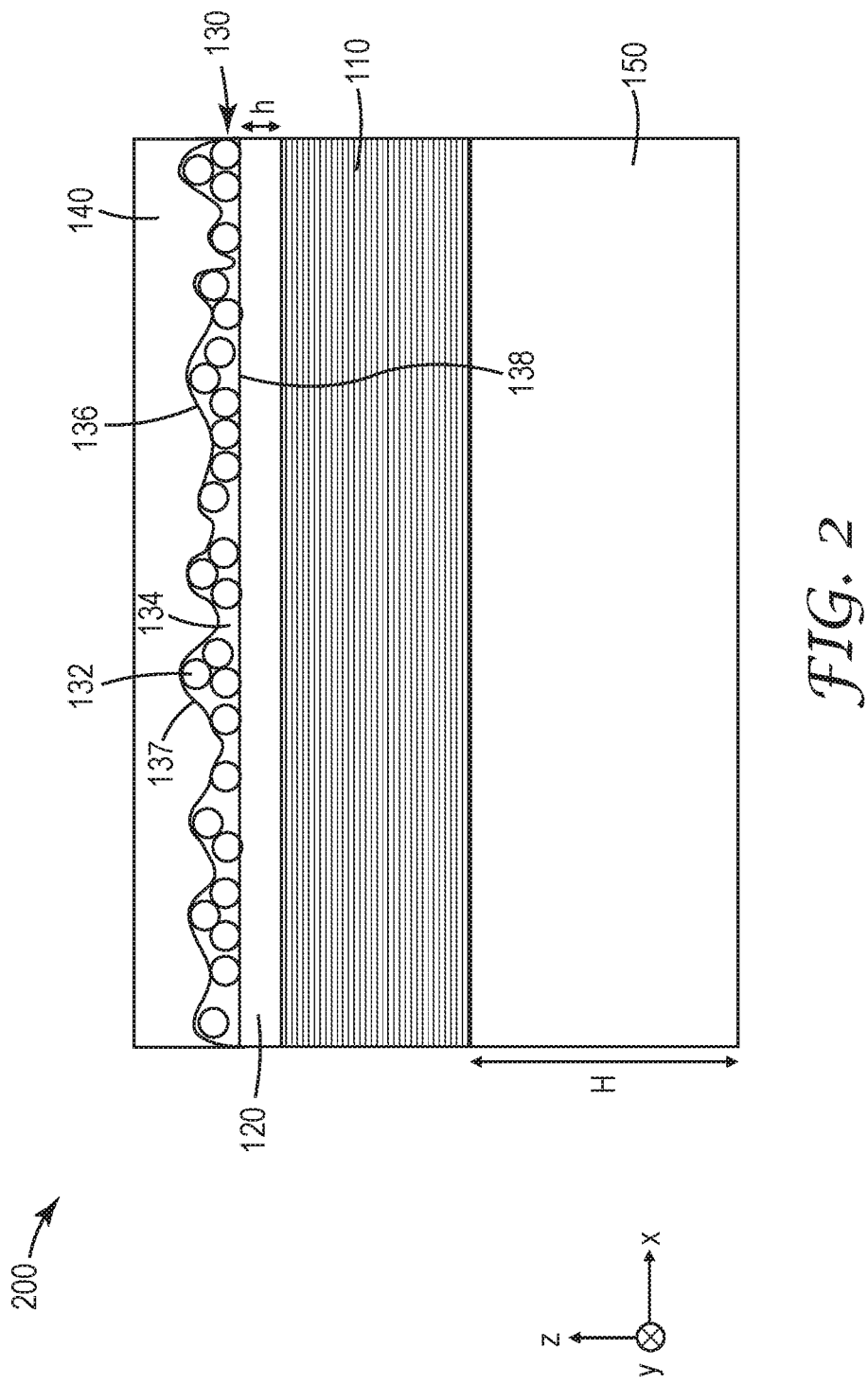

FIG. 2 is a schematic cross-sectional view of an illustrative integral multilayer optical film 200, according to some embodiments, that may correspond to optical film 100 except that optical film 200 includes layer 140 and substrate or layer 150. In the embodiment illustrated in FIG. 2, both the layers 140 and 150 are included. In other embodiments, one or both of these layers may be omitted.

In some embodiments, the integral multilayer optical film 200 includes a protective polymeric layer 140 disposed on the structured layer 130 opposite the polymeric layers 110. In some embodiments, the protective layer 140 is co-extruded and co-stretched with the structured layer 130 and the polymeric layers 110. In some embodiments, the protective layer 140 is co-extruded and optionally co-stretched with the structured layer 130 and the polymeric layers 110 and is then subsequently removed. The protective layer 140 can be removed after co-extrusion but before stretching, or can be removed after stretching. The protective layer 140 can be included to protect and/or stabilize the layer 130 during manufacturing of the film and subsequent processing of the film prior to end application use.

In some embodiments, the optical film 200 further includes a polymeric substrate 150 where the layers 110 are disposed between the polymeric substrate 150 and the structured layer 130. The substrate 150 can have an average thickness H greater than about 10 micrometers, for example. The substrate 150 can be a structural layer include to improve the strength (e.g., tensile strength) of the overall film. In some embodiments, the integral multilayer optical film 200 further include a layer of beads or particles on the substrate layer 150 opposite the layers 110 for slip control. The layer of beads or particles for slip control may be co-extruded and co-stretched with the structured layer 130 and the polymeric layers 110. Slip control layers are described in U.S. Pat. Appl. Pub. No. 2015/0226883 (Derks et al.), for example.

Figure 3:
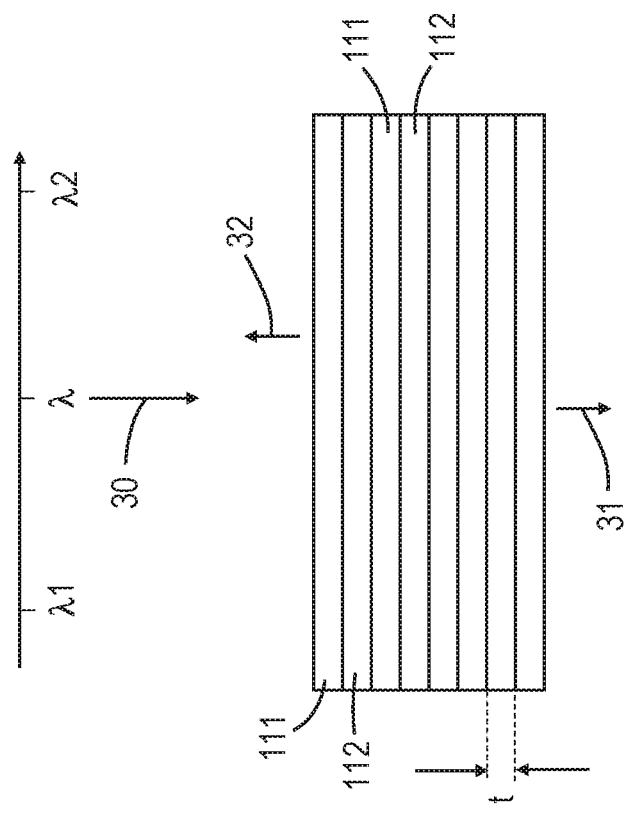
FIG. 3 is a schematic cross-sectional view of an illustrative plurality of layers.

FIG. 3 is a schematic cross-sectional view of an illustrative plurality of layers 115 (e.g., stacked polymeric layers and/or polymeric interference layers) which can correspond to layers 110 according to some embodiments. In some embodiments, the layers 115 include alternating first and second polymeric layers 111 and 112 which provide a desired reflection of substantially normally incident (e.g., within 20 degrees, or within 10 degrees, or within 5 degrees or normal incidence) light 30 having a wavelength λ in a range from λ1 to λ2. As is known in the art, multilayer optical films including alternating polymeric layers can be used to provide desired reflection and transmission in desired wavelength ranges by suitable selection of layer thicknesses. Multilayer optical films and methods of making multilayer optical films are described in U.S. Pat. No. 5,882,774 (Jonza et al.); U.S. Pat. No. 6,179,948 (Merrill et al.); U.S. Pat. No. 6,783,349 (Neavin et al.); U.S. Pat. No. 6,967,778 (Wheatley et al.); and U.S. Pat. No. 9,162,406 (Neavin et al.), for example. In some embodiments, each of the first and second layers has an average thickness less than about 500 nm, or less than about 300 nm. Additional layer(s) such as skin layers or protective boundary layers can be included in a multilayer optical film as is known in the art. The additional layer(s) may each have a thickness of greater than about 1 micrometer or greater than about 3 micrometers. A portion 31 of the light 30 is transmitted and a portion 32 of the light is reflected. In some embodiments, the integral multilayer optical film 100 or 200 or the plurality of layers 115 is a reflective polarizer. The transmitted portion 31 can be primarily for a first polarization state (e.g., polarized along the x-axis) while the reflected portion 32 can be primarily for an orthogonal second polarization state (e.g., polarized along the y-axis). The wavelength λ1 can be about 400 nm and the wavelength λ2 can be about 1500 nm. In some embodiments, the layers 115 are a plurality of polymeric interference layers numbering at least 30 in total and reflecting and transmitting light primarily by optical interference for at least one wavelength λ in a wavelength range extending from about 400 nm to about 1500 nm.

FIG. 4 is a schematic top view of an illustrative integral multilayer optical film 300, according to some embodiments, which may correspond to optical films 100 or 200, for example. In some embodiments, an integral multilayer optical film 100, or 200, or 300 includes a plurality of stacked polymeric layers 110 numbering at least 30 in total where each polymeric layer has an average thickness t (see, e.g., FIG. 3) less than about 500 nm; and a structured layer 130 disposed on the polymeric layers 110. The structured layer 130 includes a plurality of particles 132 dispersed in a binder 134, and has a first major surface 136 facing away from the polymeric layers 110 and including a plurality of structures 137 formed by the particles. In some embodiments, the structured layer 130 is co-extruded and co-stretched with the polymeric layers 110 so that for each particle (e.g., 132a) in a sub-plurality of the particles (e.g., 132a, 132b), the particle is disposed in a corresponding void 213 elongated along a first direction 215. A sub-plurality of particles in a plurality of particles is at least two, but less than all of the particles. The sub-plurality of particles may include less than about 10%, or less than about 5%, or less than about 3% of the particles in the plurality of particles, for example. FIG. 5 is a schematic cross-sectional view through a particle 132 schematically illustrating a void 213 according to some embodiments.

In some embodiments, in a plan view of the structured layer 130, an optical defect density resulting from the voids 213 is less than about 0.3/mm², or is less than about 0.2/mm², or less than about 0.15/mm², or less than about 0.12/mm², or less than about 0.1/mm². An optical defect is formed at a particle disposed in a void 213 when the void 213 is sufficiently large to substantially scatter light. Two optical defects are schematically illustrated in FIG. 4. The optical defects resulting from the voids can be seen and counted in a top view optical microscope image of the structured layer. The structured layer can be planarized by coating with a UV curable resin, for example, and curing the coating. Other suitable coatings may optionally be used. Planarizing the structured layer in this way can make the voids visible, or more readily visible, in the microscope image. The coating can be index matched to the structured surface to improve the visibility of the voids. Heat stabilizing or heat setting the film after co-extrusion and co-stretching the film has been found to reduce the optical defect density resulting from the voids 213.

In some embodiments, as described further elsewhere, the integral multilayer optical film 300 further includes a layer 120 disposed between the structured layer 130 and the stacked polymeric layers 110 where the layer 120 is co-extruded with the stacked polymeric layers 110 and the structured layer 130. The layer 120 may be referred to as a barrier layer or a strain-hardening layer or a first layer. In some embodiments, the first layer 120 has an average thickness h (see, e.g., FIGS. 1-2) greater than about 1 micrometer. In some such embodiments, or in other embodiments, the first layer 120 includes or is formed from a strain-hardening polymer. In some such embodiments, or in other embodiments, the first layer 120 has a glass transition temperature Tg1, the binder 134 has a glass transition temperature Tg2, and Tg1>Tg2. Tg1-Tg2 can be in any of the ranges described elsewhere. In some such embodiments, or in other embodiments, the barrier/strain-hardening polymer layer is provided as a skin layer or a protective boundary layer of a multilayer optical film. Including a suitable layer 120 (e.g., a barrier and/or strain-hardening layer) and/or including the layer 140 during processing of the film, can result in a reduced optical defect density resulting from voids 213.

Figure 6:
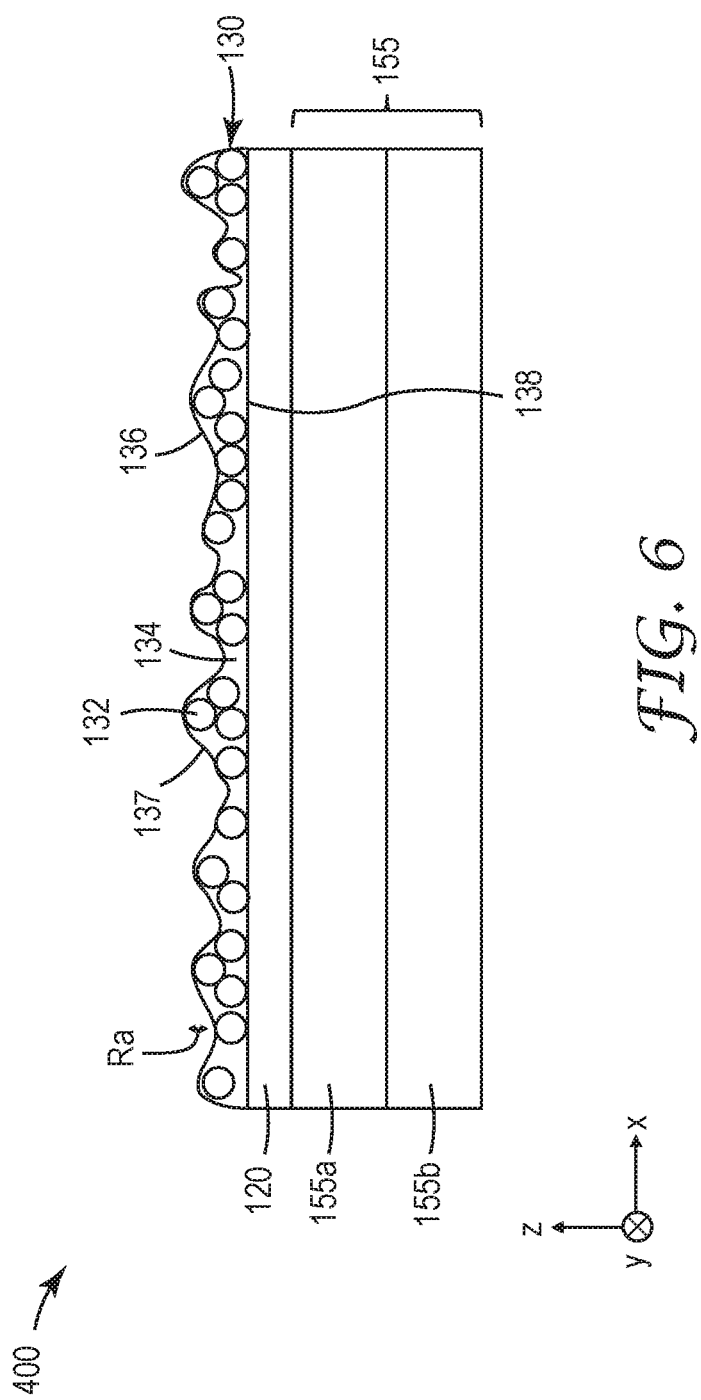
FIG. 6 is a schematic cross-sectional view of an illustrative integral multilayer optical film.

FIG. 6 is a schematic cross-sectional view of an illustrative integral multilayer optical film 400, according to some embodiments, that may correspond to integral multilayer optical films 100, 200, or 300, for example, except that the optical film 400 includes one or more polymeric layers 155. In some embodiments, the one or more polymeric layers 155 includes at least one layer (e.g., 155a, or 155b, or 155a and 155b) having a birefringence greater than about 0.1. For example, the layers 110 described elsewhere may be, or may be replaced by, the one or more layers 155. In other embodiments, the one or more polymeric layers 155 is omitted. In some embodiments, the birefringence is an in-plane birefringence (e.g., nx−ny, where nx and ny are birefringences in the x- and y-directions, respectively). In some embodiments, the birefringence is an out-of-plane birefringence (e.g., nz−½(nx+ny), where nz is the birefringence in the z-direction or thickness direction).

In some embodiments, an integral multilayer optical film 400 includes one or more polymeric layers 155 include at least one layer (e.g., 155a, or 155b, or 155a and 155b) having a birefringence greater than about 0.1, and a structured layer 130 disposed on, and co-extruded with, the one or more polymeric layers 155. The structured layer 130 can include a plurality of particles 132 dispersed in a thermoplastic binder 134 and includes a first major surface 136 facing away from the one or more polymeric layers 155 and including a plurality of structures 137 formed by the particles 132. In some embodiments, when the optical film 400 is illuminated with a light source (e.g., light source 151 or 152 depicted in FIG. 1), the optical film 400 has a first average effective transmission T1 when the first major surface 136 faces the light source 151 and a second average effective transmission T2 when the first major surface 136 faces away from the light source 152, where T1−T2≥5% or T1−T2 can be in any of the ranges described elsewhere. In some embodiments, the one or more polymeric layers 155 include a plurality of stacked polymeric layers numbering at least 30 in total where each polymeric layer has an average thickness less than about 500 nm, as described further elsewhere.

In some embodiments, the optical film 400 further includes a barrier and/or strain-hardening layer 120 disposed between the structured layer 130 and the one or more polymeric layers 155 where the barrier and/or strain-hardening layer 120 is co-extruded with the one or more polymeric layers 155 and the structured layer 130. The barrier and/or strain-hardening layer 120 can cause the particles 132 to impart a greater surface roughness Ra to the first major surface 136 of the structured layer 130 than to an opposite second major surface 138 of the structured layer 130 as described further elsewhere.

In some embodiments, an integral multilayer optical film 400 includes a strain-hardening polymer layer 120 having an average thickness greater than about 1 micrometer; and a structured layer 130 disposed on, and co-extruded with, the strain-hardening polymer layer 120. The structured layer includes a plurality of particles 132 dispersed in a thermoplastic binder 134 and has a first major surface facing away from the strain-hardening polymer layer 120 and including a plurality of structures 137 formed by the particles 132. In some embodiments, the integral multilayer optical film 400 further includes one or more polymeric layers 155 disposed on the strain-hardening polymer layer 120 opposite the structured layer 130, where the one or more polymeric layers 155 is co-extruded with the stain-hardening polymer layer 120 and the structured layer 130. In some embodiments, the one or more polymeric layers 155 includes at least one layer having a birefringence greater than about 0.1.

Figure 7:
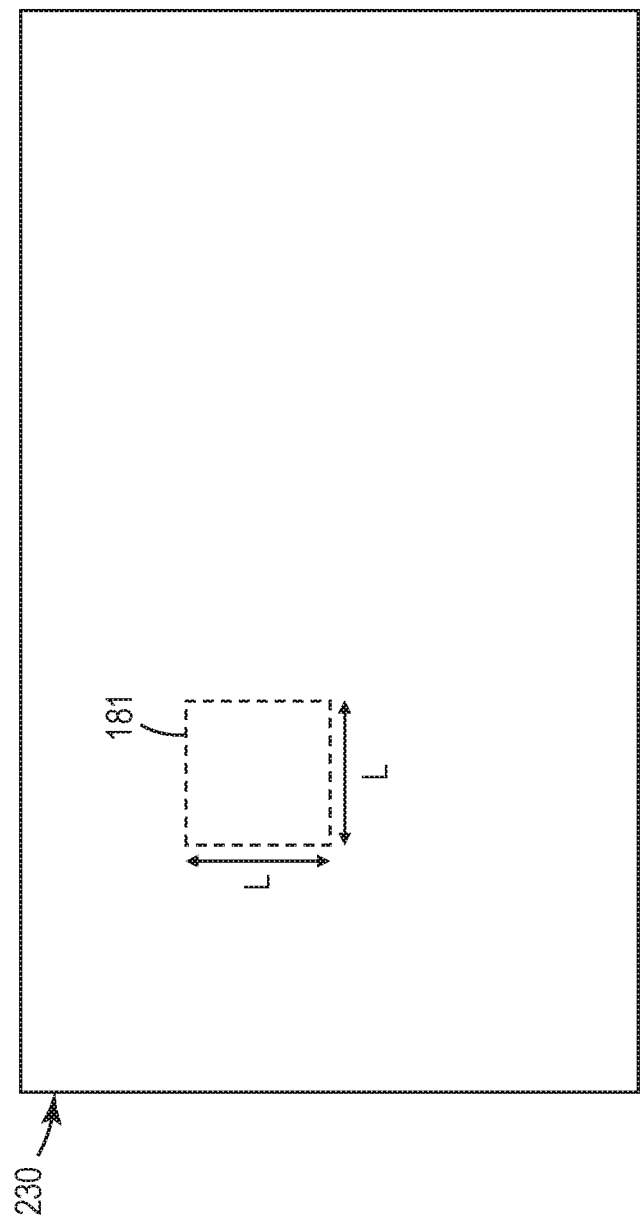
FIG. 7 is a schematic top plan view of an illustrative layer.

In some embodiments, a uniformity of a layer can be characterized by deviations of a property determined in square regions of the layer from a mean value of the property for the layer. FIG. 7 is a schematic top plan view of a layer 230 illustrating a square region 181 having sides of length L and area $L^2$. Layer 230 can correspond to layer 130, for example. In some embodiments, in a top plan view of the structured layer, the particles 132 are distributed such that for each square region 181 of the structured layer having a side having a length L of about 50 micrometers, the number of particles in the region per unit area is within about 25%, or within about 20%, or within about 15% of a mean number of particles per unit area of the structured layer. In such embodiments, the particles 132 may be described as substantially uniformly distributed across the structured layer.

EXAMPLES

Test Methods for Transmittance, Haze, and Clarity

The multilayer films were tested for Transmittance (T, %), Haze (H, %), and Clarity (C, %) using a HAZE-GARD instrument (BYK-Garner USA, Wallingford, CT). Transmittance and haze were measured according to ASTM D1003-13. Clarity was measured according to the test methods described in the manual for the instrument.

Materials

Materials used throughout the Examples are described below and were obtained as indicated:

0.62 dL/g intrinsic viscosity polyethylene terephthalate as measured in 60/40 wt. % phenol/o-dichlorobenzene at 23° C. (0.62 PET); 3M Company (St. Paul, MN).

Polyethylene 2,6-naphthalate-co-terephthalate where 90 mol % of the dicarboxylate moieties are 2,6-naphthalate (LMPEN); 3M Company (St. Paul, MN).

0.60 dL/g intrinsic viscosity polyethylene terephthalate with 0.18 mol % glycol moieties replaced with trimethylol propane (Control PET [described in U.S. Pat. Appl. Pub. No. 2011/0051040 (Johnson et al.)]); 3M Company (St. Paul, MN).

Polyethylene terephthalate-co-isophthalate where 80 mol % of the dicarboxylate moieties are terephthalate (COPETI).

Polyethylene terephthalate-co-isophthalate sodium sulfonate (polyester K [described in U.S. Pat. Appl. Pub. No. 2007/0298271 (Liu et al.)]); 3M Company (St. Paul, MN).

EASTAR Copolyester GN071 Natural amorphous glycol modified polyester (EASTAR GN071); Eastman Chemical (Kingsport, TN).

EASTMAN 14285 amorphous glycol modified polyester 0.59 dL/g intrinsic viscosity (COPET 14285); Eastman Chemical (Kingsport, TN).

MOR-ESTER AF-429-P Copolyester (AF-429-P); Dow Chemical Co. (Midland, MI)

OPTIX CA-24 poly[(methyl methacrylate)-ran-(ethyl acrylate)] (OPTIX CA-24); Plaskolite (Columbus, OH).

INGEO 4032D polylactide (INGEO 4032D); Natureworks LLC (Minnetonka, MN).

CHEMISNOW MX-500 crosslinked polymethyl methacrylate microspheres (MX-500); Soken Engineering and Chemical Co. Ltd. (Tokyo, JP).

CHEMISNOW MX-2000 crosslinked polymethyl methacrylate microspheres (MX-2000); Soken Engineering and Chemical Co. Ltd. (Tokyo, JP).

CHEMISNOW MZ-5HN crosslinked polymethyl methacrylate microspheres (MZ-5HN); Soken Engineering and Chemical Co. Ltd. (Tokyo, JP).

CHEMISNOW MZ-10HN crosslinked polymethyl methacrylate microspheres (MZ-10HN); Soken Engineering and Chemical Co. Ltd. (Tokyo, JP).

PP9074MED poly[(propylene)-ran-(ethylene)] (PP9074MED); ExxonMobil Chemical Co. (Spring, TX).

PELESTAT 230 polyether-polyolefin block copolymer anti-stat (PELESTAT 230); Sanyo Chemical Industries, Ltd. (Kyoto, JP).

TECHPOLYMER SBX-6 crosslinked polystyrene microspheres (SBX-6); Sekisui American Corporation (Secaucus, NJ).

PRO-FAX SR549M polypropylene copolymer (PRO-FAX SR549M); LyondellBasell Industries (Houston, TX).

KRATON G1645 poly[(styrene)-block-(ethylene/butylene)-block-(styrene)] (KRATON G1645); Kraton Corp. (Houston, TX).

KURARITY LA4285 poly[(methyl methacrylate)-Hock-(n-butyl acrylate)-Hock-(methyl methacrylate)] (LA4285); Kuraray Co., Ltd. (Tokyo, JP).

ESCORENE 1024E4 polypropylene homopolymer (ESCORENE 1024E4); ExxonMobil Corp. (Irving, TX).

3860X polypropylene homopolymer (3860X); Total Petrochemicals & Refining USA, Inc. (Houston, TX).

DYLARK 332-80 poly[(styrene)-ran-(maleic anhydride)] (15 wt. % maleic anhydride with a 171000 number-average molecular weight (DYLARK 332-80); Nova Chemicals (Calgary, CA).

SEGETIS 9300D levulinic acid-ketal plasticizer CAS 1259300-69-0 (1,3-Dioxolane-2-propanoic acid, 2,4-dimethyl-, 2,2'-(1,4-butanediyl) ester)) (SEGETIS 9300D); Segetis Inc. (Golden Valley, MN) acquired by GFBiochemicals (Milan, IT).

Comparative Example 1 (C1)

0.62 PET, EASTAR GN071, and polyester K were fed at 621, 71.2, and 18.3 lb/hr, respectively, to a first twin screw extruder, conveyed, melted (575° F.), and mixed.

0.62 PET and EASTAR GN071 were fed at 42 and 4.8 lb/hr, respectively, to a second twin screw extruder, conveyed, melted (568° F.) and mixed.

OPTIX CA-24 was fed at 26 lb/hr to a third twin screw extruder, conveyed, melted (535° F.) and mixed.

INGEO 4032D, OPTIX CA-24 and MX-500, which had an average diameter of 5 µm, were fed at 3.92, 2.21 and 6.38 lb/hr, respectively, to a fourth twin screw extruded and conveyed. The INGEO 4032D and OPTIX CA-24 were melted (535° F.) and mixed with the solid phase microspheres.

PP9074MED and PELESTAT 230 were fed at 103 and 3 lb/hr, respectively, to a fifth twin screw extruder, conveyed, melted (516° F.), and mixed.

The five melt trains were then extruded through a feedblock and die where the first melt train fed a first exterior layer adjacent to a packet of more than 30 alternating interior layers fed by the second and third melt trains that when stretched had an average layer thickness of less than 500 nm excluding the two outermost layers of the packet. The two outermost layers of the packet were fed by the second melt train. The fourth melt train fed an interior layer adjacent to the packet of alternating layers opposite the layer of first exterior layer. The fifth melt train fed a second exterior layer. The layers were cast with electrostatic pinning against a chilled wheel where the second exterior layer was adjacent to wheel with a total castweb thickness and fourth melt train interior layer thickness of 884 and 20 µm, respectively.

Figure 8A:
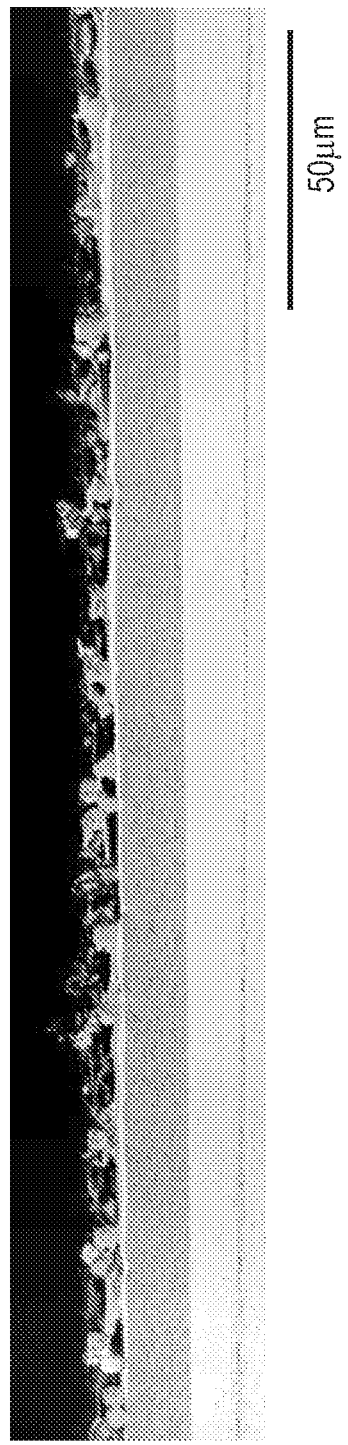
FIG. 8A is an image of a cross-section of an optical film.
Figure 8B:
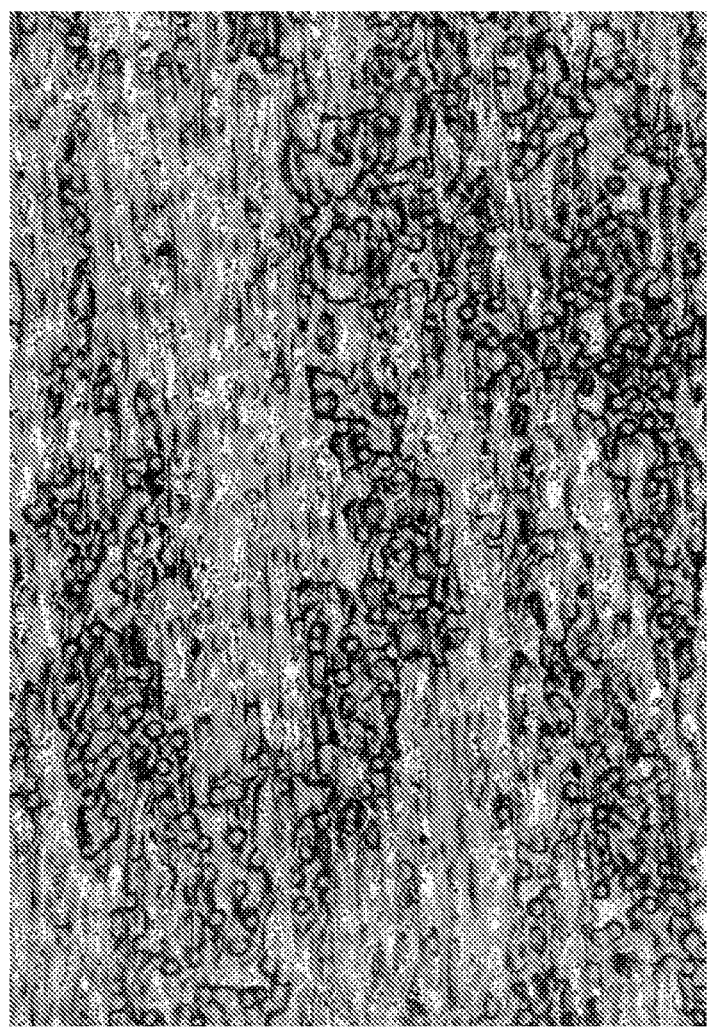
FIG. 8B is a top view image of the optical film of FIG. 8A.

The castweb was fed to a tenter, heated to 230° F. and stretched in the transverse direction to a draw ratio of about four and a quarter. The oriented film was then heat stabilized by heating to 320° F. while holding the film in tension, cooled and then wound up into a roll. The second exterior layer was mechanically peeled back from the film exposing the microsphere filled interior layer from the fourth melt train. The film was measured for transmission, haze, and clarity in a HAZE-GARD instrument with the microsphere filled layer facing towards from the light source. Transmission was also measured with microsphere filled layer facing towards the detector. The measured results are provided in Table 3. As shown in Examples 2-3, the difference in average effective transmission when the microsphere filled layer faces the light source and average effective transmission when the microsphere filled layer faces the detector can be increased by increasing the draw ratio so that the barrier/strain-hardening layer causes the microspheres to protrude further from the surface. FIG. 8A is an image of a cross-section of the optical film of Comparative Example 1. FIG. 8B is a top view image of the optical film of Comparative Example 1.

Comparative Example 2 (C2)

A castweb was extruded in the same manner as Comparative Example 1 except as described in Tables 1-2. The second exterior layer was mechanically removed from the castweb exposing the microsphere filled interior layer. The castweb (now with microsphere filled exterior layer) was fed to a tenter where it was heated to 200° F. and stretched in the transverse direction to a draw of about four and a quarter. The oriented film was then heat stabilized by heating to 450° F. while holding the film in tension, cooled and then wound up into a roll. The film was measured in the same manner as Comparative Example 1. The measured results are provided in Table 3. As shown in Example 4, the difference (delta T) in average effective transmission when the microsphere filled layer faces the light source and average effective transmission when the microsphere filled layer faces the detector can be increased by increasing the initial thickness of the microsphere filled layer.

Comparative Examples 3-4 (C3-C4)

Figure 9B:
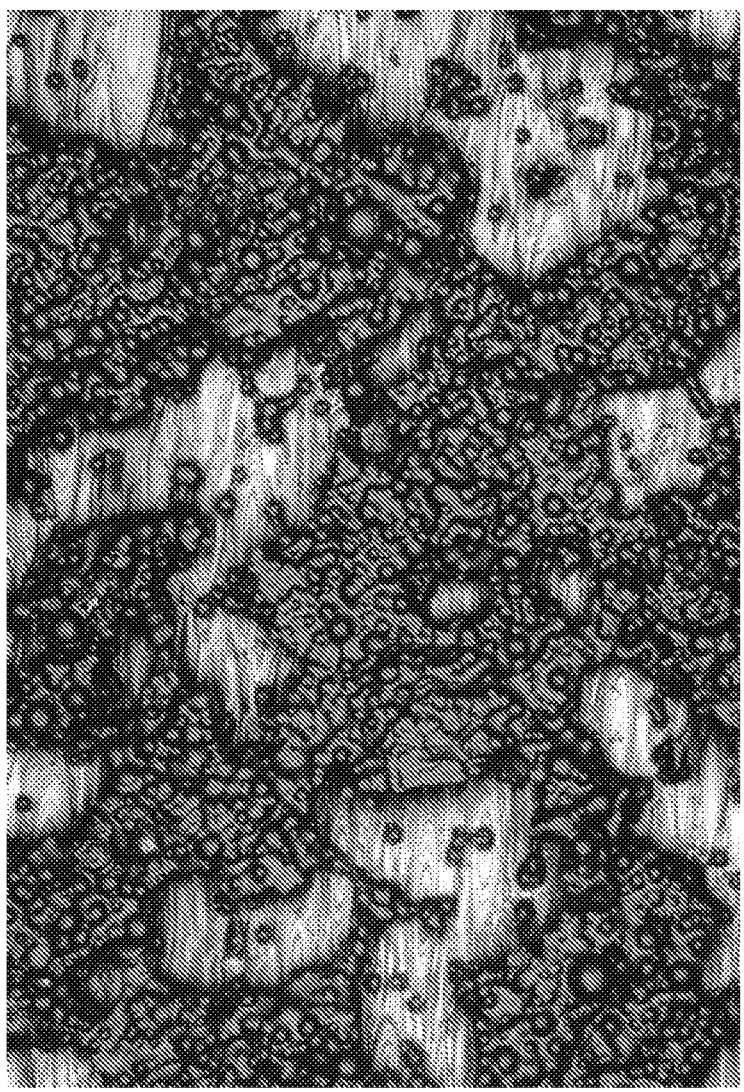
FIG. 9B is a top view image of the optical film of FIG. 9A.

Castwebs were extruded, stretched, heat stabilized, and measured in the same manner as Comparative Example 1, except as described in Tables 1-2. The measured results are provided in Table 3. Comparative Example C3 was stretched with the second exterior layer removed at a high draw temperature and high heat stabilization temperature which contributed to the relative low delta T. Comparative Example 4 showed clumping of microspheres which were reduced in Example 18 by increasing the draw temperature. FIG. 9A is an image of a cross-section of the optical film of Comparative Example 4 where clumping of the microspheres can be seen. FIG. 9B is a top view image of the optical film of Comparative Example 4.

Examples 1-18 (E1-E18)

Figure 10A:
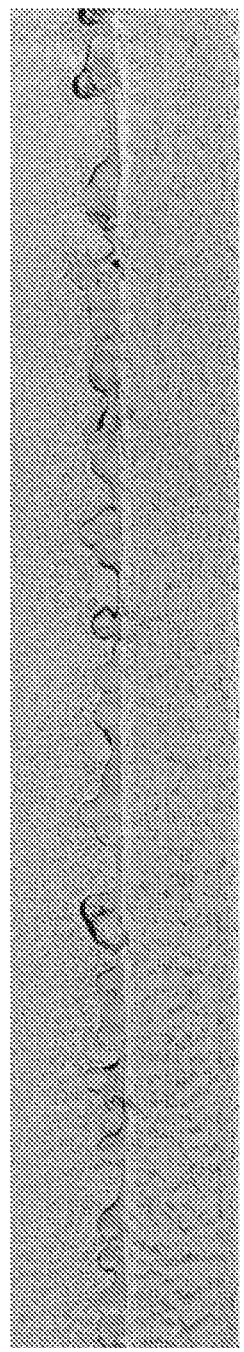
FIG. 10A is an image of a cross-section of an exemplary integral multilayer optical film.
Figure 10B:
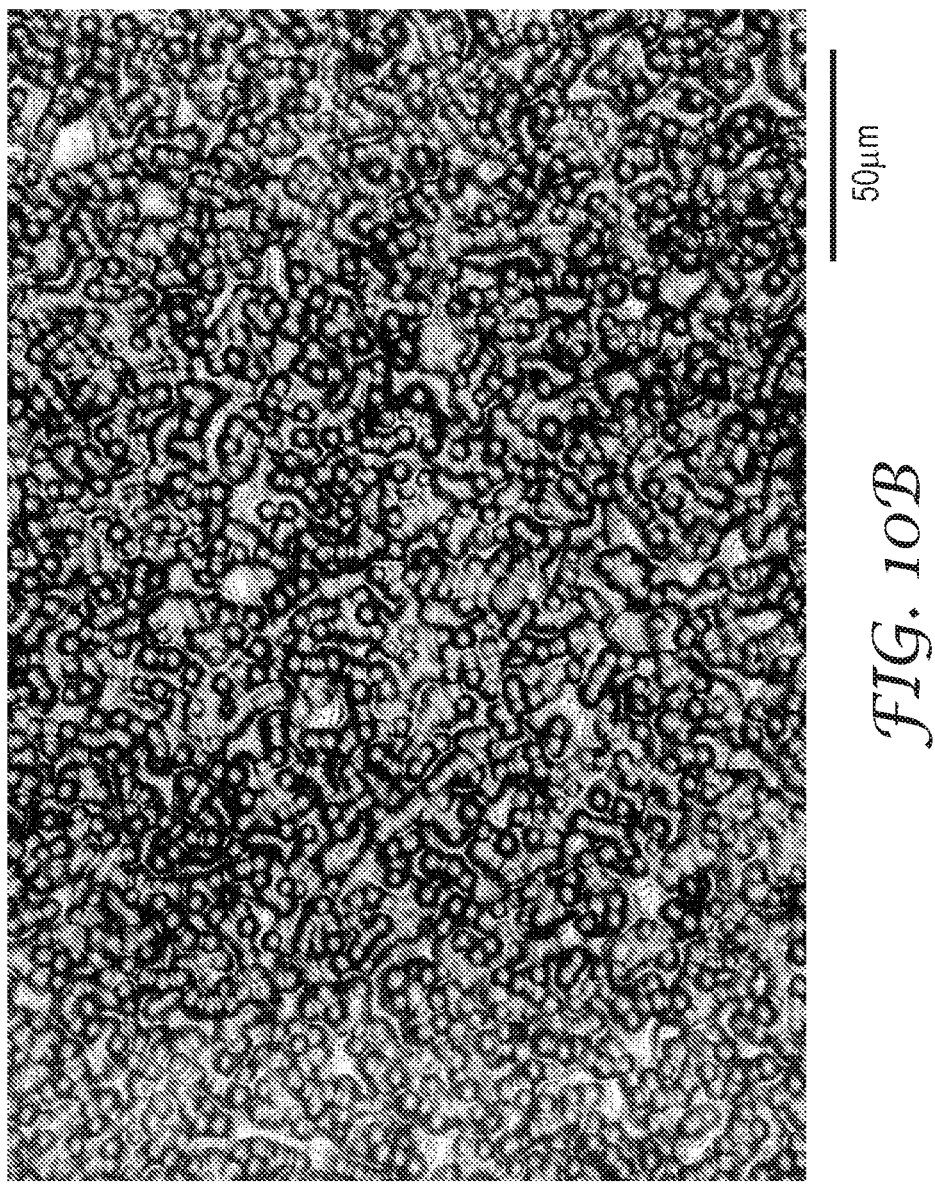
FIG. 10B is a top view image of the optical film of FIG. 10A.

A castweb was extruded, stretched, heat stabilized, and measured in the same manner as Comparative Example 1 except as indicated in Tables 1-2. The outermost layer of the packet formed from the second and third melt streams that faced the microsphere filled layer was a barrier/strain-hardening layer. Results are provided in Table 3. FIG. 10A is an image of a cross-section of the optical film of Example 7. FIG. 10B is a top view image of the optical film of Example 7.

Example 19 (E19)

A castweb was extruded in the same manner as Comparative Example 1 except as described in Tables 1-2. The second exterior layer was mechanically removed from the castweb exposing the microsphere filled interior layer. Upon bending the castweb to a small radius of less than half an inch with the microsphere filled layer on convex side of the bent castweb, the now exterior microsphere filled layer remained intact on the adjacent LMPEN layer—the outermost layer of the alternating packet of layers. The castweb was stretched, heat stabilized, and measured as described in Tables 2-3. Masking tape (3M General Purpose Masking Tape #2030, 1 inch wide, 3M Company, St. Paul, MN) was attached to finished film's microsphere filled exterior layer and 90 degrees peels were initiated in the both the MD and TD direction. The microsphere filled exterior layer remained intact on the LMPEN layer—the outermost layer of the alternating packet of layers.

Example 20 (E20)

A castweb was extruded in the same manner as Comparative Example 1 except as described in Tables 1-2. The second exterior layer was mechanically removed from the castweb exposing the microsphere filled interior layer. Upon bending the castweb to a small radius of less than half an inch with the microsphere filled layer on convex side of the bent castweb, the exterior microsphere filled layer delaminated from the adjacent LMPEN layer—the outermost layer of the alternating packet of layers. The castweb was stretched, heat stabilized, and measured as described in Tables 2-3.

Masking tape was attached to finished film's microsphere filled exterior layer and 90 degrees peels were initiated in the both the MD and TD direction. The microsphere filled exterior layer was removed with the tape exposing the LMPEN layer—the outermost layer of the alternating packet of layers.

Figure 11A:
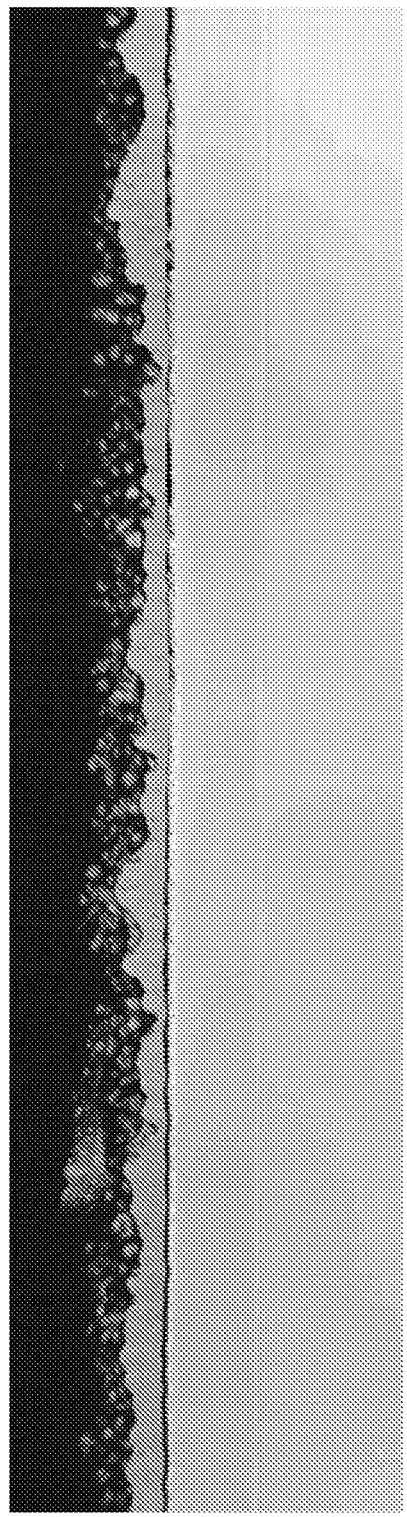
FIG. 11A is an image of a cross-section of another exemplary integral multilayer optical film.
Figure 11B:
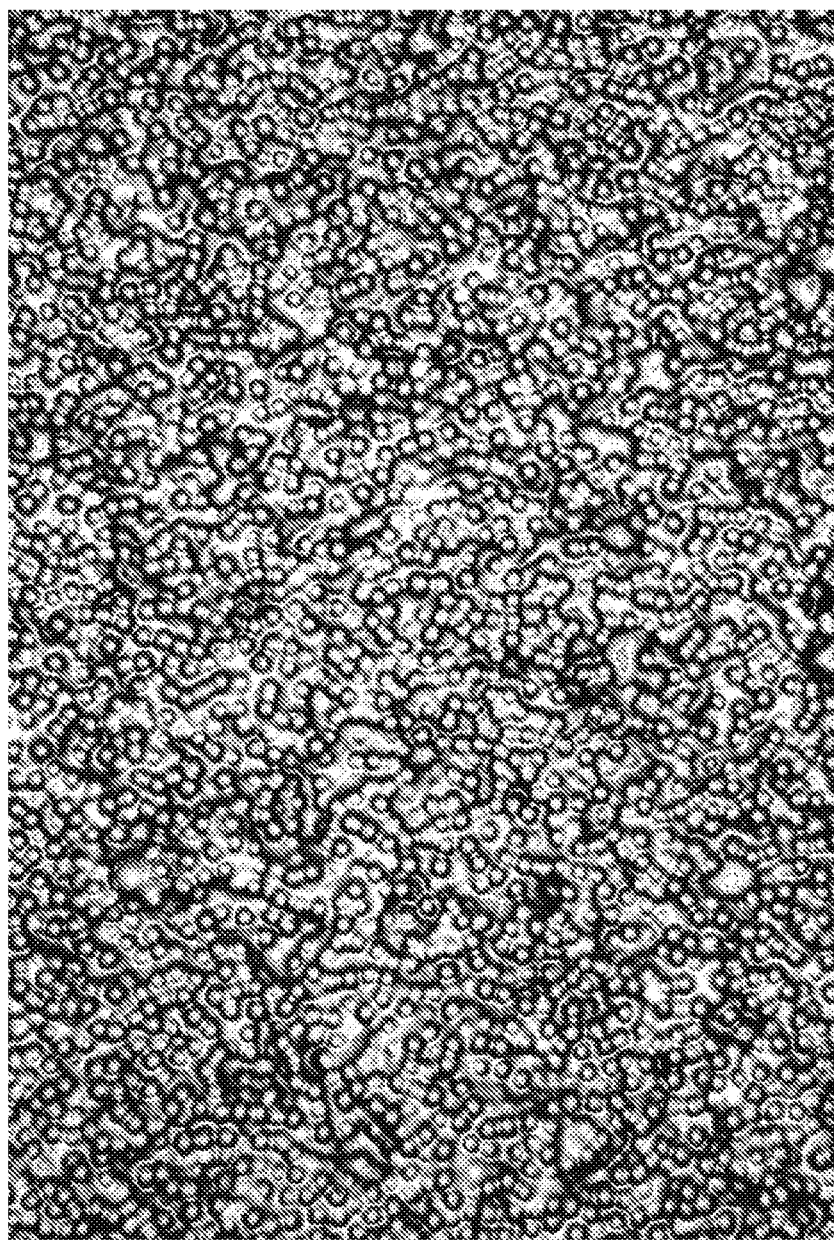
FIG. 11B is a top view image of the optical film of FIG. 11A.

FIG. 11A is an image of a cross-section of the optical film of Example 20. FIG. 11B is a top view image of the optical film of Example 20.

Example 21 (E21)

A castweb was extruded in the same manner as Comparative Example 1 except as described in Tables 1-2. The second exterior layer was mechanically removed from the castweb exposing the microsphere filled interior layer. Upon bending the castweb to a small radius of less than half an inch with the microsphere filled layer on convex side of the bent film, the now exterior microsphere filled layer remained intact on the adjacent LMPEN layer—the outermost layer of the alternating packet of layers. The castweb was stretched, heat stabilized, and measured as described in Tables 2-3. Masking tape was attached to finished film's microsphere filled exterior layer and 90 degrees peels were initiated in the both the MD and TD direction. The microsphere filled exterior layer remained intact on the LMPEN layer—the outermost layer of the alternating packet of layers.

Example 22 (E22)

Control PET (dried to a dew point of −40° F.) was fed at 30 lb/hr to a first extruder (single screw type), conveyed, melted (551° F.), and mixed.

Control PET was fed at 15 lb/hr to a second extruder (twin screw type), conveyed, melted (551° F.), and mixed.

INGEO 4032D, OPTIX CA-24 and MZ-10HN, which had a 10 μm volume average particle size, were fed at 2.81, 0.94 and 3.75 lb/hr, respectively, to a third extruder (twin screw type), conveyed. The INGEO 4032D and OPTIX CA-24 were melted (479° F.) and mixed with the solid phase microspheres.

PRO-FAX SR549M and KRATON G1645 were fed at 22 and 3 lb/hr, respectively, to a fourth extruder (twin screw type), conveyed, melted (526° F.), and mixed.

The four melt trains were then extruded through a feedblock and die where the first melt train fed a first exterior layer, the second melt train fed a first interior layer adjacent to the first exterior layer, the third melt train fed a second interior layer adjacent to the first interior layer and the fourth melt train fed a second exterior layer adjacent to the second interior layer. The layers were cast with electrostatic pinning against a chilled wheel where the second exterior layer was adjacent to wheel with a total thickness and second interior layer thickness of 207 and 27 μm, respectively.

The second exterior layer was mechanically removed from the castweb exposing the microsphere filled interior layer. The castweb was cut into sheets and stretched in a batch stretcher in the transverse direction at 239° F. with a constant draw rate of 5%/s to a draw ratio of 3.5. The film was measured for transmission, haze, and clarity in a HAZE-GARD instrument with the microsphere filled layer facing towards the detector. Transmission was also measured with microsphere filled layer facing towards the source. The measured results are provided in Table 3.

Example 23 (E23)

A castweb was extruded, stretched, heat stabilized, and measured in the same manner as Example 22 except as described in Tables 1-3. Compared to Example 22, including the SEGETIS 9300D plasticizer resulted in an increase in the difference in average effective transmission when the microsphere filled layer faces the light source and average effective transmission when the microsphere filled layer faces away from the light source.

Example 24 (E24)

LMPEN was fed at 20 lb/hr to a first twin screw extruder, conveyed, melted (551° F.), and mixed.

LMPEN was fed at 15 lb/hr to a second twin screw extruder, conveyed, melted (549° F.), and mixed.

EASTAR GN071 (dried to a dew point of −40° F.) and SBX-6, which had an average diameter of 6 μm, were fed at 3.63 and 3.52 lb/hr, respectively, to a third twinscrew extruder and conveyed. The EASTAR GN071 was melted (516° F.) and mixed with the solid phase microspheres.

PRO-FAX SR549M and KRATON G1645 were fed at 7.2 and 1.8 lb/hr, respectively, to a fourth twin screw extruder, conveyed, melted (492° F.), and mixed.

The four melt trains were then extruded through a feedblock and die where the first melt train fed a first exterior layer, the second melt train fed a first interior layer adjacent to the first exterior layer, the third melt train fed a second interior layer adjacent to the first interior layer and the fourth melt train fed a second exterior layer adjacent second interior layer. The layers were cast with electrostatic pinning against a chilled wheel where the second exterior layer was adjacent to wheel with a total thickness and second interior layer thickness of 130 and 21 μm, respectively.

The second exterior layer was mechanically removed from the castweb exposing the microsphere filled interior layer. The castweb was cut into sheets and stretched in a batch stretcher in the transverse direction at 275° F. with a constant draw rate of 10%/s to a draw ratio of 5. The film was measured for transmission, haze, and clarity in a HAZE-GARD instrument with the microsphere filled layer facing towards the detector. Transmission was also measured with microsphere filled layer facing towards the source. The measured results are provided in Table 3.

Example 25 (E25)

Prior to extrusion, DYLARK 332-80 was dried to a dew point of −40° F. A castweb was extruded, stretched, heat stabilized, and measured in the same manner as Example 24 except as described in Tables 1-3. Compared to Example 24, including the DYLARK 332-80 maleic anhydride compatibilizer resulted in an increase in the difference in average effective transmission when the microsphere filled layer faces the light source and average effective transmission when the microsphere filled layer faces the detector.

TABLE 1

| | Extruder 1 | | Extruder 2 | | Extruder 3 | | Extruder 4 | | Extruder 5 | |
|---|---|---|---|---|---|---|---|---|---|---|
| | Resins (Rates, lb/hr) | Melt Temp (° F.) | Resins (Rates, lb/hr) | Melt Temp (° F.) | Resins (Rates, lb/hr) | Melt Temp (° F.) | Resins (Rates, lb/hr) | Melt Temp (° F.) | Resins (Rates, lb/hr) | Melt Temp (° F.) |
| C1 | 0.62 PET (621), EASTAR GN071 (71.2), polyester K (18.3) | 575 | 0.62 PET (42), EASTAR GN071 (4.8) | 568 | OPTIX CA-24 (26) | 535 | INGEO 4032D (3.92), OPTIX CA-24 (2.21), MX-500 (6.38) | 516 | PP9074MED (103), PELESTAT 230 (3) | 517 |
| C2 | 0.62 PET (621), EASTAR GN071 (71.2), polyester K (18.3) | 576 | 0.62 PET (42), EASTAR GN071 (4.8) | 568 | OPTIX CA-24 (26) | 536 | INGEO 4032D (3.92), OPTIX CA-24 (2.21), MX-500 (6.38) | 461 | PP9074MED (103), PELESTAT 230 (3) | 517 |
| C3 | 0.62 PET (187), EASTAR GN071 (78), polyester K (2.5) | 561 | LMPEN (42.8) | 564 | LMPEN (33.6) | 564 | INGEO 4032D (8.25), OPTIX CA-24 (2.75), MX-500 (14) | 465 | ESCORENE 1024E4 (66.7), 3860X (87.8), PELESTAT 230 (3.9) | 540 |
| C4 | EASTAR GN071 (106), polyester K (2) | 523 | LMPEN (43) | 566 | EASTAR GN071 (33.5) | 551 | INGEO 4032D (8.4), OPTIX CA-24 (2.8), MZ-5HN (13.6) | 488 | PRO-FAX SR549M (164), PELESTAT 230 (4) | 506 |
| E1 | 0.62 PET (187), EASTAR GN071 (78), polyester K (2.5) | 562 | LMPEN (43) | 564 | LMPEN (33.5) | 566 | EASTAR GN071 (12.7), SBX-6 (10.3) | 519 | ESCORENE 1024E4 (67), 3860X (89), PELESTAT 230 (4) | 539 |
| E2 | 0.62 PET (131.5), EASTAR GN071 (13), polyester K (4) | 543 | 0.62 PET (68.8), EASTAR GN071 (6.9) | 559 | 0.62 PET (6), EASTAR GN071 (54) | 565 | INGEO 4032D (7.5), MX-500 (6.35) | 460 | PP9074MED (145), PELESTAT 230 (5) | 516 |
| E3 | 0.62 PET (131.5), EASTAR GN071 (13), polyester K (4) | 543 | 0.62 PET (68.8), EASTAR GN071 (6.9) | 575 | 0.62 PET (6), EASTAR GN071 (54) | 525 | INGEO 4032D (5.25), OPTIX CA-24 (1.75), MX-500 (5.93) | 455 | PP9074MED (97), PELESTAT 230 (2) | 495 |
| E4 | 0.62 PET (131.5), EASTAR GN071 (13), polyester K (4) | 543 | 0.62 PET (68.8), EASTAR GN071 (6.9) | 559 | 0.62 PET (6), EASTAR GN071 (54) | 563 | INGEO 4032D (5.625), OPTIX CA-24 (1.375), MX-500 (6.35) | 493 | PP9074MED (97), PELESTAT 230 (2) | 493 |
| E5 | 0.62 PET (131.5), EASTAR GN071 (13), polyester K (4) | 544 | 0.62 PET (68.8), EASTAR GN071 (6.9) | 560 | 0.62 PET (6), EASTAR GN071 (54) | 563 | INGEO 4032D (5.625), OPTIX CA-24 (1.375), SBX-6 (6.57) | 497 | PP9074MED (145), PELESTAT 230 (5) | 482 |
| E6 | 0.62 PET (421), EASTAR GN071 (48), polyester K (12.5) | 560 | 0.62 PET (42.5), EASTAR GN071 (4.3) | 568 | OPTIX CA-24 (26) | 536 | INGEO 4032D (5.25), OPTIX CA-24 (1.75), MX-500 (5.93) | 464 | PP9074MED (250), PELESTAT 230 (7) | 497 |
| E7 | 0.62 PET (621), EASTAR GN071 (48), polyester K (12.4) | 560 | 0.62 PET (42.2), EASTAR GN071 (4.6) | 568 | OPTIX CA-24 (26) | 535 | INGEO 4032D (3.92), OPTIX CA-24 (2.21), MX-500 (6.38) | 488 | PP9074MED (240), PELESTAT 230 (7) | 497 |
| E8 | 0.62 PET (187), EASTAR GN071 (78), polyester K (2.5) | 557 | LMPEN (43) | 564 | LMPEN (33.6) | 563 | COPET 14285 (12.7), SBX-6 (9.8) | 483 | ESCORENE 1024E4 (133), PELESTAT 230 (3.4) | 507 |
| E9 | 0.62 PET (187), EASTAR GN071 (78), polyester K (2.5) | 557 | LMPEN (43) | 564 | LMPEN (33.6) | 565 | COPET 14285 (12.7), SBX-6 (9.8) | 560 | ESCORENE 1024E4 (67), 3860X (89), PELESTAT 230 (4) | 507 |
| E10 | 0.62 PET (131.5), EASTAR GN071 (13), polyester K (4) | 542 | 0.62 PET (68.8), EASTAR GN071 (6.9) | 559 | 0.62 PET (6), EASTAR GN071 (54) | 564 | INGEO 4032D (5.625), OPTIX CA-24 (1.375), MZ-10HN (6.35) | 499 | PP9074MED (145), PELESTAT 230 (5) | 493 |
| E11 | 0.62 PET (131.5), EASTAR GN071 (13), polyester K (4) | 544 | 0.62 PET (68.8), EASTAR GN071 (6.9) | 559 | 0.62 PET (6), EASTAR GN071 (54) | 563 | INGEO 4032D (7.05), OPTIX CA-24 (2.35), MZ-10HN (7.96) | 497 | PP9074MED (145), PELESTAT 230 (5) | 482 |

TABLE 1-continued

| | Extruder 1 | | Extruder 2 | | Extruder 3 | | Extruder 4 | | Extruder 5 | |
|---|---|---|---|---|---|---|---|---|---|---|
| | Resins (Rates, lb/hr) | Melt Temp (° F.) | Resins (Rates, lb/hr) | Melt Temp (° F.) | Resins (Rates, lb/hr) | Melt Temp (° F.) | Resins (Rates, lb/hr) | Melt Temp (° F.) | Resins (Rates, lb/hr) | Melt Temp (° F.) |
| E12 | EASTAR GN071 (147) | 517 | LMPEN (75) | 550 | LMPEN (60) | 550 | PETg 14285 (7.5), MX-500 (6.35) | 536 | ESCORENE 1024E4 (145), PELESTAT 230 (5) | 493 |
| E13 | 0.62 PET (131.5), EASTAR GN071 (13), polyester K (4) | 544 | 0.62 PET (68.8), EASTAR GN071 (6.9) | 558 | 0.62 PET (6), EASTAR GN071 (54) | 564 | INGEO 4032D (5.06), OPTIX CA-24 (2.64), MX-500 (8.18), MX-2000 (2.73) | 503 | PP9074MED (146), PELESTAT 230 (3) | 483 |
| E14 | 0.62 PET (131.5), EASTAR GN071 (13), polyester K (4) | 560 | 0.62 PET (68.8), EASTAR GN071 (6.9) | 560 | 0.62 PET (6), EASTAR GN071 (54) | 563 | INGEO 4032D (7.91), OPTIX CA-24 (1.68), MX-500 (2.1), MX-2000 (5.24) | 502 | PP9074MED (145), PELESTAT 230 (3) | 485 |
| E15 | 0.62 PET (228), EASTAR GN071 (23), polyester K (5) | 545 | 0.62 PET(41) | 556 | OPTIX CA-24 (26) | 542 | INGEO 4032D (6.825), OPTIX CA-24 (2.275), MX-500 (4.22) | 477 | PP9074MED (105.4), PELESTAT 230 (1.1) | 529 |
| E16 | 0.62 PET (419), EASTAR GN071 (23), polyester K (5) | 559 | 0.62 PET (41.5), EASTAR GN071 (4.6) | 568 | OPTIX CA-24 (26) | 542 | COPETI (3.46), AF-429-P (3.46), MX-500 (5.1) | 490 | PP9074MED (206.4), PELESTAT 230 (6) | 510 |
| E17 | 0.62 PET (228), EASTAR GN071 (23), polyester K (5) | 545 | 0.62 PET (41) | 556 | OPTIX CA-24 (26) | 542 | INGEO 4032D (5.25), OPTIX CA-24 (1.75), MX-500 (5.92) | 490 | PP9074MED (105.4), PELESTAT 230 (1.1) | 528 |
| E18 | EASTAR GN071 (106), polyester K (2) | 523 | LMPEN (43) | 566 | EASTAR GN071 (33.5) | 551 | INGEO 4032D (8.4), OPTIX CA-24 (2.8), MZ-5HN (13.6) | 488 | PRO-FAX SR549M (164), PELESTAT 230 (4) | 506 |
| E19 | EASTAR GN071 (78), polyester K (2.5) | 525 | LMPEN (43) | 575 | EASTAR GN071 (33.5) | 525 | EASTAR GN071 (13.39), SBX-6 (12.61) | 515 | ESCORENE 1024E4 (157.8), PELESTAT 230 (4) | 515 |
| E20 | 0.62 PET (187), EASTAR GN071 (78), polyester K (2.5) | 525 | LMPEN (43) | 575 | LMPEN (33.6) | 575 | INGEO 4032D (12.02), OPTIX CA-24 (4.01), MX-500 (13.98) | 465 | ESCORENE 1024E4 (67), 3860X (88), PELESTAT 230 (3.9) | 515 |
| E21 | EASTAR GN071 (106), polyester K (2) | 525 | LMPEN (43.1) | 575 | EASTAR GN071 (33.52) | 550 | LA4285 (6.76), INGEO 4032D (5.7), OPTIX CA-24 (1.9), MZ-5HN (9.4) | 425 | PRO-FAX SR549M (162.8), PELESTAT 230 (4) | 505 |
| E22 | Control PET (30) | 551 | Control PET (15) | 551 | INGEO 4032D (2.8), OPTIX CA-24 (0.9), MZ-10HN (3.75) | 479 | PRO-FAX SR549M (22), Kraton G1645 (3) | 526 | — | — |
| E23 | Control PET (30) | 552 | Control PET (15) | 552 | SEGETIS 9300D (0.24) INGEO 4032D (2.8), OPTIX CA-24 (0.9), MZ-10HN (3.75) | 479 | PRO-FAX SR549M (22), Kraton G1645 (3) | 527 | — | — |
| E24 | LMPEN (20) | 551 | LMPEN (15) | 549 | EASTAR GN071 (3.5), SBX-6 (3.6) | 516 | PRO-FAX SR549M (7.2), Kraton G1465 (1.8) | 492 | — | — |
| E25 | LMPEN (20) | 543 | LMPEN (15) | 551 | EASTAR GN071 (3.43), SBX-6 (3.6), DYLARK 332-80 (0.07) | 534 | PRO-FAX SR549M (7.2), Kraton G1645 (1.8) | 527 | — | — |

TABLE 2

Cast Thickness

| | Total (μm) | Microsphere Filled Layer Only (μm) | Exterior Layer Adjacent to Microsphere Filled Layer Peeled Before Orientation | Orientation Draw Ratio | Draw Temp (° F.) | Heat Stabilized Temp (° F.) |
|---|---|---|---|---|---|---|
| C1 | 884 | 20 | No | 4.25 | 230 | 320 |
| C2 | 884 | 20 | Yes | 4.25 | 200 | 450 |
| C3 | 562 | 30 | Yes | 5.0 | 270 | 380 |
| C4 | 509 | 28 | No | 5.2 | 253 | 253 |
| E1 | 631 | 30 | No | 5.0 | 250 | 200 |
| E2 | 726 | 20 | No | 5.0 | 200 | 365 |
| E3 | 582 | 22 | No | 5 | 200 | 375 |
| E4 | 582 | 55 | Yes | 4.3 | 200 | 365 |
| E5 | 581 | 24 | No | 5.0 | 200 | 365 |
| E6 | 858 | 24 | Yes | 4.5 | 205 | 300 |
| E7 | 1067 | 25 | Yes | 4.5 | 205 | 375 |
| E8 | 605 | 30 | Yes | 4.0 | 260 | 380 |
| E9 | 632 | 30 | Yes | 5.0 | 270 | 200 |
| E10 | 681 | 22 | No | 4.3 | 200 | 385 |
| E11 | 1175 | 35 | No | 5.0 | 200 | 365 |
| E12 | 684 | 20 | No | 4.3 | 280 | 380 |
| E13 | 728 | 40 | No | 5 | 200 | 365 |
| E14 | 695 | 30 | No | 5 | 200 | 365 |
| E15 | 525 | 22 | No | 4.75 | 210 | 430 |
| E16 | 1175 | 20 | No | 4.25 | 210 | 450 |
| E17 | 519 | 14 | No | 4.75 | 195 | 375 |
| E18 | 509 | 28 | No | 5.2 | 273 | 273 |
| E19 | 476 | 40 | Yes | 5.3 | 263 | 263 |
| E20 | 595 | 25 | Yes | 5.0 | 270 | 200 |
| E21 | 207 | 27 | Yes | 3.5 | 239 | None |
| E22 | 130 | 21 | Yes | 5.0 | 275 | None |
| E23 | 207 | 27 | Yes | 3.5 | 239 | None |
| E24 | 513 | 15 | No | 5.25 | 273 | 273 |
| E25 | 141 | 29 | Yes | 5 | 275 | None |

TABLE 3

| | Transmission (%) | | | Haze (%) | Clarity (%) |
|---|---|---|---|---|---|
| | Microsphere Filled Layer Toward Source | Microsphere Filled Layer Toward Detector | Delta T (Source - Detector) | Microsphere Filled Layer Toward Source | Microsphere Filled Layer Toward Source |
| C1 | 63.6 | 60.4 | 3.2 | 94.4 | 6.1 |
| C2 | 62.6 | 59.5 | 3.1 | 94.6 | 12.5 |
| C3 | 90 | 85.7 | 4.3 | 93.9 | 8.2 |
| C4 | 44.7 | 43.6 | 1.1 | 88.15 | 32.6 |
| E1 | 85.4 | 70.8 | 14.6 | 97.7 | 10.3 |
| E2 | 96.5 | 80 | 16.5 | 93.85 | 12.45 |
| E3 | 97.1 | 78.8 | 18.3 | 94.75 | 9.5 |
| E4 | 97.6 | 78 | 19.6 | 96.45 | 6.75 |
| E5 | 94.7 | 79.1 | 15.6 | 97.25 | 6.8 |
| E6 | 75.1 | 61.3 | 13.8 | 93.2 | 17.6 |
| E7 | 69.6 | 57.5 | 12.1 | 94.4 | 7.3 |
| E8 | 89.9 | 72.2 | 17.7 | 99.9 | 6.4 |
| E9 | 92.8 | 70.9 | 21.9 | 98.1 | 6.5 |
| E10 | 95.5 | 80 | 15.5 | 89.3 | 13.9 |
| E11 | 95.9 | 77.8 | 18.1 | 93.3 | 15.6 |
| E12 | 95.9 | 81.4 | 14.5 | 95.2 | 7.35 |
| E13 | 94.8 | 79.7 | 15.1 | 94.1 | 14.65 |
| E14 | 95.6 | 82.5 | 13.1 | 88.45 | 17.4 |
| E15 | 95.1 | 75 | 20.1 | 95 | 4.2 |
| E16 | 72.4 | 59.6 | 12.8 | 82.8 | 28.4 |
| E17 | 81.9 | 69.3 | 12.6 | 87.15 | 8.1 |
| E18 | 51.1 | 42.1 | 9 | 97.9 | 20.5 |
| E19 | 51.4 | 40.5 | 10.9 | 99.7 | 12.95 |
| E20 | 93.2 | 72.1 | 21.1 | 98.2 | 6.4 |
| E21 | 50.9 | 41 | 9.9 | 96.5 | 21.3 |
| E22 | 94.6 | 78.7 | 12.4 | 94.3 | 8.1 |
| E23 | 98.4 | 77.2 | 21.2 | 88.2 | 10.5 |
| E24 | 98 | 75.2 | 22.8 | 98.2 | 3.7 |
| E25 | 98.5 | 73.9 | 24.6 | 98.7 | 3.7 |

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. An integral multilayer optical film comprising:
a plurality of polymeric interference layers numbering at least 30 in total and reflecting and transmitting light primarily by optical interference for at least one wavelength in a wavelength range extending from about 400 nm to about 1500 nm;
a structured layer disposed on the interference layers and comprising a plurality of particles dispersed in a binder, and opposing first and second major surfaces, the first major surface facing away from the interference layers, the second major surface facing the interference layers; and
a barrier layer disposed between the structured layer and the interference layers and co-extruded at least with the interference layers and the structured layer, the barrier layer causing the particles to impart a greater surface roughness to the first major surface than the second major surface so that in a case that the optical film is illuminated with a light source, the optical film has a first average effective transmission T1 in a case that the first major surface faces the light source and a second average effective transmission T2 in a case that the first major surface faces away from the light source, T1−T2≥5%, wherein the structured layer is co-stretched with the interference layers and the barrier layer so that for each particle in a sub-plurality of the particles, the particle is disposed in a corresponding void elongated along a first direction.

2. The integral multilayer optical film of claim 1, wherein the binder comprises a polymethylmethacrylate copolymer and polylactic acid.

3. The integral multilayer optical film of claim 1, wherein the particles comprise a polymer.

4. The integral multilayer optical film of claim 3, wherein the polymer comprises polymethylmethacrylate or polystyrene.

5. The integral multilayer optical film of claim 1, wherein the particles have an average diameter in a range of about 5 to about 20 micrometers.

6. The integral multilayer optical film of claim 1, wherein the particles are substantially spherical.

7. The integral multilayer optical film of claim 1, wherein the particles have a refractive index greater than about 1.45.

8. The integral multilayer optical film claim 1, wherein the barrier layer has an average thickness greater than about 1 micrometer.

9. The integral multilayer optical film of claim 1 being a reflective polarizer.

10. The integral multilayer optical film of claim 1, wherein T1−T2≥14%.

11. An integral multilayer optical film comprising:
a plurality of stacked polymeric layers numbering at least 30 in total, each polymeric layer having an average thickness less than about 500 nm; and
a structured layer disposed on the polymeric layers and comprising:
a plurality of particles dispersed in a binder; and
a first major surface facing away from the polymeric layers and comprising a plurality of structures formed by the particles, the structured layer co-extruded and co-stretched with the polymeric layers so that for each particle in a sub-plurality of the particles, the particle is disposed in a corresponding void elongated along a first direction, the sub-plurality of the particles comprising less than about 10 percent of the particles in the plurality of particles, wherein for each particle in the plurality of particles that is not in the sub-plurality of the particles, the particle is not disposed in a void sufficiently large to substantially scatter light.

12. The integral multilayer optical film of claim 11, wherein in a plan view of the structured layer, an optical defect density resulting from the voids is less than about 0.15/mm$^2$.

13. The integral multilayer optical film of claim 11 further comprising a protective polymeric layer disposed on the structured layer opposite the plurality of stacked polymeric layers, the protective layer co-extruded and co-stretched with the structured layer and the plurality of stacked polymeric layers.

14. The integral multilayer optical film of claim 11 further comprising a first layer having an average thickness greater than about 1 micrometer disposed between the structured layer and the stacked polymeric layers, the first layer co-extruded with the stacked polymeric layers and the structured layer, the first layer having a glass transition temperature Tg1 and comprising a strain-hardening polymer, the binder having a glass transition temperature Tg2, Tg1>Tg2.

15. The integral multilayer optical film of claim 11, wherein the sub-plurality of the particles comprises less than about 3 percent of the particles in the plurality of particles.

16. An integral multilayer optical film comprising:
a strain-hardening polymer layer having an average thickness greater than about 1 micrometer; and
a structured layer disposed on, and co-extruded with, the strain-hardening polymer layer, the structured layer comprising:
a plurality of particles dispersed in a thermoplastic binder; and
a first major surface facing away from the strain-hardening polymer layer and comprising a plurality of structures formed by the particles,
wherein in a case that the optical film is illuminated with a light source, the optical film has a first average effective transmission T1 in a case that the first major surface faces the light source and a second average effective transmission T2 in a case that the first major surface faces away from the light source, T1−T2≥5%, wherein the structured layer is co-stretched with the strain-hardening polymer layer so that for each particle in a sub-plurality of the particles, the particle is disposed in a corresponding void elongated along a first direction.

17. The integral multilayer optical film of claim 16 further comprising one or more polymeric layers disposed on the strain-hardening polymer layer opposite the structured layer, the one or more polymeric layers being co-extruded with the stain-hardening polymer layer and the structured layer, the one or more polymeric layers comprising at least one layer having a birefringence greater than about 0.1.

18. The integral multilayer optical film of claim 16, wherein T1−T2≥14%.

* * * * *